US011518836B2

(12) United States Patent
Yoon et al.

(10) Patent No.: US 11,518,836 B2
(45) Date of Patent: Dec. 6, 2022

(54) ELECTRODE PROTECTIVE LAYER POLYMER AND SECONDARY BATTERY TO WHICH SAME IS APPLIED

(71) Applicant: LG CHEM, LTD., Seoul (KR)

(72) Inventors: Jeongae Yoon, Daejeon (KR); Sujee Kwon, Daejeon (KR); Bora Jung, Daejeon (KR); Sung Soo Yoon, Daejeon (KR); Byoungkuk Son, Daejeon (KR); Eunkyung Park, Daejeon (KR); Minchul Jang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 292 days.

(21) Appl. No.: 16/954,016

(22) PCT Filed: May 8, 2019

(86) PCT No.: PCT/KR2019/005445
§ 371 (c)(1),
(2) Date: Jun. 15, 2020

(87) PCT Pub. No.: WO2020/022620
PCT Pub. Date: Jan. 30, 2020

(65) Prior Publication Data
US 2021/0087317 A1 Mar. 25, 2021

(30) Foreign Application Priority Data

Jul. 27, 2018 (KR) .................... 10-2018-0087897
Jul. 27, 2018 (KR) .................... 10-2018-0087904

(51) Int. Cl.
| | | |
|---|---|---|
| C08F 259/08 | (2006.01) | |
| C08F 214/22 | (2006.01) | |
| C09D 127/16 | (2006.01) | |
| H01M 4/04 | (2006.01) | |
| H01M 4/66 | (2006.01) | |
| C09D 151/00 | (2006.01) | |
| H01M 4/02 | (2006.01) | |
| H01M 4/62 | (2006.01) | |
| H01M 4/36 | (2006.01) | |
| H01M 4/13 | (2010.01) | |

(52) U.S. Cl.
CPC .......... *C08F 259/08* (2013.01); *C08F 214/22* (2013.01); *C09D 127/16* (2013.01); *C09D 151/003* (2013.01); *H01M 4/0404* (2013.01); *H01M 4/667* (2013.01); *H01M 4/13* (2013.01); *H01M 4/366* (2013.01); *H01M 4/62* (2013.01); *H01M 2004/028* (2013.01)

(58) Field of Classification Search
CPC .. C08F 220/286; C08F 259/08; C08F 214/24; C08F 220/20; C08F 14/24; C08F 114/24
See application file for complete search history.

(56) References Cited

U.S. PATENT DOCUMENTS

| | | | |
|---|---|---|---|
| 9,349,497 B2 | 5/2016 | Kim et al. | |
| 9,634,309 B2 | 4/2017 | Park et al. | |
| 2002/0061448 A1 | 5/2002 | Morigaki et al. | |
| 2002/0147282 A1* | 10/2002 | Mayes ................ | B01D 69/141 525/276 |
| 2005/0042515 A1 | 2/2005 | Hwang et al. | |
| 2005/0170255 A1 | 8/2005 | Koh et al. | |
| 2005/0233221 A1 | 10/2005 | Araki et al. | |
| 2005/0271948 A1 | 12/2005 | Kang et al. | |
| 2007/0244262 A1* | 10/2007 | Zhang .................. | C08F 259/08 525/242 |
| 2009/0061313 A1 | 3/2009 | Tadano | |
| 2012/0107726 A1* | 5/2012 | Ogata .................. | H01L 51/004 257/E51.026 |
| 2015/0080524 A1 | 3/2015 | Yoon et al. | |

(Continued)

FOREIGN PATENT DOCUMENTS

| | | |
|---|---|---|
| CN | 101378135 A | 3/2009 |
| CN | 105073839 A | 11/2015 |

(Continued)

OTHER PUBLICATIONS

European Patent Office Search Report dated Apr. 6, 2021 for corresponding EP Application No. 19840537.5.
International Search Report for PCT/KR2019/005445 (PCT/ISA/210) dated Aug. 14, 2019.
Liu et al., "Synthesis, characterization and electrochemical transport properties of the poly(ethyleneglycol)-grafted poly(vinylidenefluoride) nanoporous membranes", Reactive & Functional Polymers 47 (2001), pp. 201-213.
Tong et al., "Design of amphiphilic poly(vinylidene fluoride-co-hexafluoropropylene)-based gel electrolytes for high-performance lithium-ion batteries", Ionics (2016) 22, pp. 1311-1318.

*Primary Examiner* — Mark S Kaucher
(74) *Attorney, Agent, or Firm* — Birch, Stewart, Kolasch & Birch, LLP

(57) ABSTRACT

A polymer for an electrode protective layer including a polymer (A) including a fluorine-based polymer in which a monomer unit including poly(alkylene oxide) and a monomer unit including a curable functional group (e.g., a thermocurable functional group or a photocurable functional group) are grafted on the fluorine-based polymer, and when preparing an electrode by coating an electrode active material layer using the polymer and curing (e.g., thermally curing or photocuring) the result, excellent lithium ion conductivity is obtained since lithium ion flow is not inhibited, chemical resistance for an electrolyte liquid is high, and voltage stability of a secondary battery may be enhanced by suppressing side reactions with the electrolyte liquid occurring on an electrode active material surface due to properties of a uniform and flexible protective layer.

10 Claims, No Drawings

(56) References Cited

U.S. PATENT DOCUMENTS

| | | |
|---|---|---|
| 2015/0155539 A1* | 6/2015 | Park .................. C08F 259/08 525/244 |
| 2015/0349309 A1 | 12/2015 | Abusleme et al. |
| 2016/0336620 A1 | 11/2016 | Yang et al. |
| 2016/0380314 A1 | 12/2016 | Yang et al. |
| 2018/0051137 A1 | 2/2018 | Kim et al. |
| 2018/0151887 A1 | 5/2018 | Yang et al. |

FOREIGN PATENT DOCUMENTS

| | | |
|---|---|---|
| CN | 106299244 A | 1/2017 |
| CN | 107534128 A | 1/2018 |
| EP | 3 664 210 A1 | 6/2020 |
| JP | 2000-173607 A | 6/2000 |
| JP | 2002-117899 A | 4/2002 |
| JP | 2005-350673 A | 12/2005 |
| KR | 10-0378348 B1 | 6/2003 |
| KR | 10-0497251 B1 | 6/2005 |
| KR | 10-2005-0092722 A | 9/2005 |
| KR | 10-2013-0135789 A | 12/2013 |
| KR | 10-2015-0063870 A | 6/2015 |
| KR | 10-2015-0100754 A | 9/2015 |
| KR | 10-2016-0033608 A | 3/2016 |
| KR | 10-2016-0058274 A | 5/2016 |
| KR | 10-2017-0036481 A | 4/2017 |
| KR | 10-2018-0005173 A | 1/2018 |
| WO | WO 2017/093460 A1 | 6/2017 |
| WO | WO 2019/054622 A1 | 3/2019 |

* cited by examiner

ELECTRODE PROTECTIVE LAYER POLYMER AND SECONDARY BATTERY TO WHICH SAME IS APPLIED

TECHNICAL FIELD

This application claims the benefits of priority based on Korean Patent Application No. 10-2018-0087897, filed on Jul. 27, 2018, and Korean Patent Application No. 10-2018-0087904, filed on the same date, the entire contents of which are incorporated herein by reference.

The present invention relates to a polymer for an electrode protective layer, and a secondary battery using the polymer, and more particularly, to a protective layer capable of enhancing electrochemical stability by suppressing side reactions on an active material surface caused by an electrolyte liquid without inhibiting lithium ion transfer on the active material of a secondary battery electrode, and a secondary battery using the same.

BACKGROUND ART

A secondary battery that is representatively known among electrochemical devices refers to a device storing external electrical energy after converting to a form of chemical energy, and generating electricity when needed. A term "rechargeable battery" is also used in that the battery is able to be charged many times. Commonly used secondary batteries may include a lead storage battery, a nickel-cadmium (Ni—Cd) battery, a nickel hydrogen (NiMH) storage battery, a lithium ion (Li-ion) battery, and a lithium ion polymer (Li-ion polymer) battery. Secondary batteries offer both economic and environmental advantages over one-time-use primary batteries.

With recent gradual development of wireless communication technologies, weight lightening of portable devices or automobile accessories has been required, and demands for secondary batteries used as an energy source for these devices have increased.

High energy density lithium secondary batteries mainly used in laptops and smart phones currently include a positive electrode formed with lithium oxide, a carbon-based negative electrode, a separator, and a liquid-state or solid-state electrolyte. As application areas for lithium secondary batteries expand to electric vehicles (EV) or energy storage systems (ESS), environments for the battery use become severe such that the driving voltage increases to 4.5 V or higher, and metal lithium is used as a negative electrode. A metal lithium negative electrode has received much attention with very high theoretical specific capacity of 3860 mAh/g and lowest electrochemical potential of −3.04 V (vs. standard hydrogen electrode), however, commercialization thereof has been delayed due to problems such as side reactions with an electrolyte liquid or non-uniform deposition/elution of lithium.

Metal lithium continuously forms a solid electrolyte interface (SEI) through a reaction with an organic electrolyte liquid and a lithium salt dissolved therein. The SEI layer continues to undergo destruction and regeneration while a charge and discharge cycle of a battery is repeated, and a newly exposed lithium metal surface reacts again with an electrolyte liquid to induce a decrease in the Coulombic efficiency and a short-circuit through lithium dendrite growth in the battery, which delays commercialization of a secondary battery using a metal lithium electrode.

As a solution to such a problem, attempts to coat a stable artificial SEI layer on an electrode active material surface such as lithium metal, and improve cycle properties therethrough have been made. For example, studies on improving cycle properties through suppressing lithium dendrite formation or side reactions by applying and coating polyacetylene, tetraethoxysilane, lithium phosphorous oxynitride, alumina particles, an ultra-thin alumina film or the like on a lithium film have been actively progressed. However, a phenomenon of reduced electrode protective effect was still observed after continuous battery driving, and this has been analyzed to be due to low lithium ion conductivity of an electrode, low flexibility, and crack occurrences caused by a non-uniform coating film.

PRIOR ART DOCUMENTS

Patent Documents (Patent Document 1) Korean Patent Application Laid-Open Publication No. 2016-0058274 (2016 May 25), "Binder containing polymer formed by branching of block copolymer including polypropylene oxide block and polyethylene oxide block".

DISCLOSURE

Technical Problem

As a result of extensive studies in view of the above, the inventors of the present invention have found out that, when preparing a polymer for an electrode protective layer by graft copolymerizing a monomer unit comprising poly(alkylene oxide) having ion conductivity and a monomer unit comprising a thermocurable functional group or a photocurable functional group on a fluorine-based polymer having a high dielectric constant, and using the same in a secondary battery to protect a lithium metal surface or an active material surface, chemical resistance for an electrolyte liquid is high while having excellent lithium ion conductivity since lithium ion flow is not inhibited in the electrolyte liquid by lithium ion conductivity, and voltage stability of a secondary battery is enhanced by suppressing side reactions with the electrolyte liquid occurring on an electrode active material surface due to properties of a uniform and flexible protective layer, and have completed the present invention.

Accordingly, an aspect of the present invention provides a polymer for an electrode protective layer including a polymer in which a monomer unit comprising poly(alkylene oxide) and a monomer unit comprising a thermocurable functional group or a photocurable functional group are grafted on a fluorine-based polymer.

Technical Solution

According to an aspect of present invention, there is provided a polymer for an electrode protective layer including a polymer (A) comprising a fluorine-based polymer in which a monomer unit comprising poly(alkylene oxide) and a monomer unit comprising a curable functional group (e.g. a thermocurable functional group or a photocurable functional group) are grafted on the fluorine-based polymer.

In one specific embodiment of the present invention, the fluorine-based polymer comprises a structure of the following Chemical Formula 1.

[Chemical Formula 1]

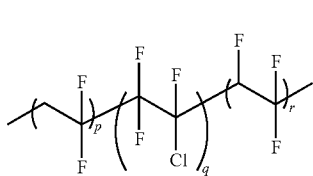

In Chemical Formula 1, p, q, and r are each independently $0 \leq p \leq 20{,}000$, $1 \leq q \leq 22{,}000$, and $0 \leq r \leq 15{,}000$.

In one specific embodiment of the present invention, the polymer (A) includes a structure of the following Chemical Formula 2.

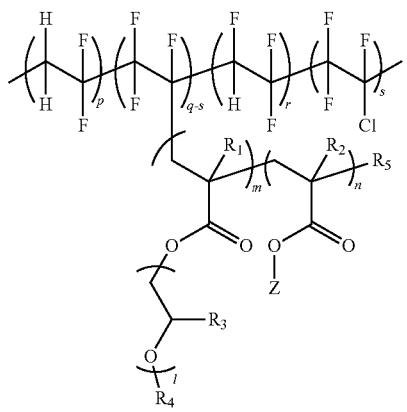

In Chemical Formula 2, p, q, r, and s are each independently $0 \leq p \leq 20{,}000$, $0 < q \leq 22{,}000$, $0 \leq r \leq 15{,}000$, and $0 \leq s < 22{,}000$, $R_1$, $R_2$, and $R_3$ are each independently hydrogen or methyl, $R_4$ is any one selected from the group consisting of hydrogen, an alkyl group having 1 to 12 carbon atoms, and a phenyl group unsubstituted or substituted with an alkyl group having 1 to 12 carbon atoms, Z is a curable functional group represented by the following Chemical Formula 3 or Chemical Formula 4, l, m, and n are each independently $2 \leq l \leq 230$, $1 \leq m \leq 200$, and $2 \leq n \leq 50$, and $R_5$ is any one selected from the group consisting of hydrogen, chlorine, and bromine,

[Chemical Formula 3]

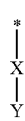

in Chemical Formula 3,

X is a single bond, or alkylene having 1 to 6 carbon atoms or phenylene,

Y is one or more functional groups selected from the group consisting of hydrogen, a hydroxyl group, an alkoxysilyl group, a phosphate group, a succinate group, a phthalate group, and an isocyanate group, and

* represents a bonding site directly bonding to O in Chemical Formula 2,

[Chemical Formula 4]

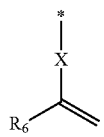

in Chemical Formula 4,

X is a single bond, or any one selected from the group consisting of alkylene having 1 to 12 carbon atoms, alkyleneoxycarbonyl having 1 to 12 carbon atoms

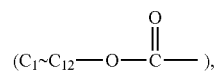

urethane group-containing alkyleneoxycarbonyl having 1 to 12 carbon atoms, poly(ethylene oxide)carbonyl having an ethylene oxide repeating number of 1 to 10 and phenylene, and

* represents a bonding site directly bonding to O in Chemical Formula 2.

In addition, in one specific embodiment of the present invention, the polymer (A) includes a structure of the following Chemical Formula 5 or Chemical Formula 6.

[Chemical Formula 5]

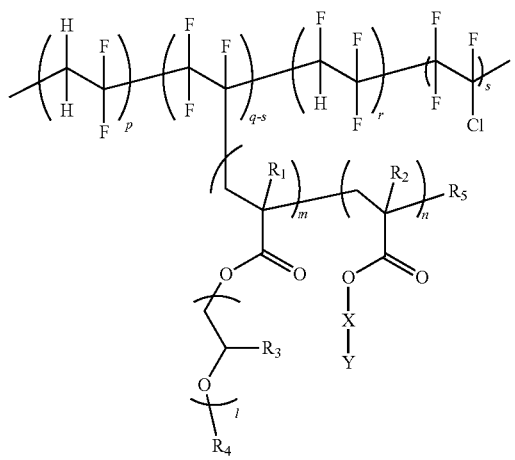

In Chemical Formula 5, p, q, r, and s are each independently $0 \leq p \leq 20{,}000$, $0 < q \leq 22{,}000$, $0 \leq r \leq 15{,}000$, and $0 \leq s < 22{,}000$, $R_1$, $R_2$, and $R_3$ are each independently hydrogen or methyl, $R_4$ is any one selected from the group consisting of hydrogen, an alkyl group having 1 to 12 carbon atoms, and a phenyl group unsubstituted or substituted with an alkyl group having 1 to 12 carbon atoms, X is a single bond, or alkylene having 1 to 6 carbon atoms or phenylene, Y is one or more functional groups selected from the group consisting of hydrogen, a hydroxyl group, an alkoxysilyl group, a phosphate group, a succinate group, a phthalate group, and an isocyanate group, l, m, and n are each independently $2 \leq l \leq 230$, $1 \leq m \leq 200$, and $2 \leq n \leq 50$, and $R_5$ is any one selected from the group consisting of hydrogen, chlorine, or bromine,

[Chemical Formula 6]

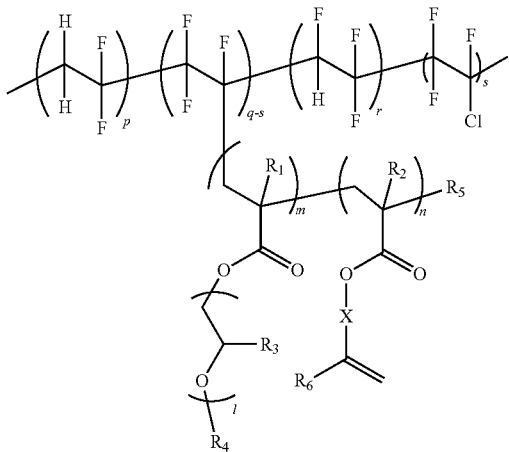

in Chemical Formula 6, p, q, r, and s are each independently $0 \leq p \leq 20,000$, $0 < q \leq 22,000$, $0 \leq r \leq 15,000$, and $0 \leq s < 22,000$, $R_1$, $R_2$, $R_3$, and $R_6$ are each independently hydrogen or methyl, $R_4$ is any one selected from the group consisting of hydrogen, an alkyl group having 1 to 12 carbon atoms, and a phenyl group unsubstituted or substituted with an alkyl group having 1 to 12 carbon atoms, X is a single bond, or any one selected from the group consisting of alkylene having 1 to 12 carbon atoms, alkyleneoxycarbonyl having 1 to 12 carbon atoms

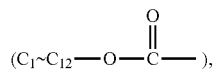

urethane group-containing alkyleneoxycarbonyl having 1 to 12 carbon atoms, poly(ethylene oxide)carbonyl having an ethylene oxide repeating number of 1 to 10 and phenylene, l, m, and n are each independently $2 \leq l \leq 230$, $1 \leq m \leq 200$, and $2 \leq n \leq 50$, and $R_5$ is any one selected from the group consisting of hydrogen, chlorine, and bromine.

In one specific embodiment of the present invention, the poly(alkylene oxide) is poly(ethylene oxide) or poly(propylene oxide).

In one specific embodiment of the present invention, the thermocurable functional group is any one or more selected from the group consisting of a carboxylic acid group, a hydroxyl group, an alkoxysilyl group, a phosphate group, a succinate group, a phthalate group, and an isocyanate group.

In one specific embodiment of the present invention, the monomer unit comprising the poly(alkylene oxide) and the monomer unit comprising the thermocurable functional group are included in a molar ratio of 99.9:0.1 to 70:30.

According to another aspect of present invention, there is provided a polymer composition for an electrode protective layer including the polymer for an electrode protective layer described above and a multifunctional crosslinking agent.

In one specific embodiment of the present invention, the multifunctional crosslinking agent is present in an amount 0.1 parts by weight to 10 parts by weight with respect to 100 parts by weight of the polymer (A).

In one specific embodiment of the present invention, the multifunctional crosslinking agent is any one selected from the group consisting of an isocyanate crosslinking agent, an epoxy crosslinking agent, an aziridine crosslinking agent, an alcohol crosslinking agent, and an amine-based crosslinking agent.

According to another aspect of present invention, there is provided an electrode protective layer formed by thermally curing the polymer composition for an electrode protective layer described above.

In one specific embodiment of the present invention, the electrode includes an electrode active material, and the electrode active material is any one selected from the group consisting of metal lithium, a positive electrode active material, and a negative electrode active material.

In one specific embodiment of the present invention, the photocurable functional group is an unsaturated vinyl group.

In one specific embodiment of the present invention, the monomer unit comprising the poly(alkylene oxide) and the monomer unit comprising the photocurable functional group are included in a molar ratio of 99.9:0.1 to 70:30.

According to another aspect of present invention, there is provided a polymer composition for an electrode protective layer including the polymer for an electrode protective layer described above, a multifunctional vinyl-based crosslinking agent, and a photoinitiator.

In one specific embodiment of the present invention, the multifunctional vinyl-based crosslinking agent is present in an amount 0.1 parts by weight to 50 parts by weight with respect to 100 parts by weight of the polymer (A) In one specific embodiment of the present invention, the photoinitiator is present in an amount of 0.01 parts by weight to 5 parts by weight based on a total 100 parts by weight of the polymer (A) and the multifunctional vinyl-based crosslinking agent.

According to another aspect of present invention, there is provided an electrode protective layer formed by photocuring the polymer composition for an electrode protective layer described above.

In one specific embodiment of the present invention, the electrode includes an electrode active material, and the electrode active material is any one selected from the group consisting of metal lithium, a positive electrode active material, and a negative electrode active material.

According to another aspect of present invention, there is provided a secondary battery including an electrode including the electrode protective layer described above.

Advantageous Effects

A polymer for an electrode protective layer according to the present invention includes a polymer (A) prepared by grafting a monomer unit comprising poly(alkylene oxide) and a monomer unit comprising a thermocurable functional group or a photocurable functional group on a fluorine-based polymer having a high dielectric constant, and when preparing an electrode by coating an electrode active material layer using the same and thermally curing or photocuring the result, excellent lithium ion conductivity is obtained since lithium ion flow is not inhibited, chemical resistance for an electrolyte liquid is high, and voltage stability of a secondary battery can be enhanced by suppressing side reactions with the electrolyte liquid occurring on an electrode active material surface due to properties of a uniform and flexible protective layer.

BEST MODE

Hereinafter, the present invention will be described in more detail.

Terms or words used in the present specification and the claims are not to be interpreted limitedly to common or dictionary meanings, and shall be interpreted as meanings and concepts corresponding to technological ideas of the present disclosure based on a principle in which the inventors may suitably define the concepts of terms in order to describe the invention in the best possible way.

Terms used in the present invention are for describing specific embodiments only and do not intend to limit the present invention. Singular forms used herein include plural forms as well, unless the context clearly indicates otherwise. In the present invention, terms such as "include" or "have" are to specify the presence of features, numbers, steps, operations, constituents, components, or combinations thereof described in the present specification, and need to be construed as not excluding in advance the possibility of presence or addition of one or more of other features, numbers, steps, operations, constituents, components, or combinations thereof.

<Polymer for Electrode Protective Layer>

A fluorine-based polymer has a very high degree of lithium ion dissociation with a dielectric constant of approximately 9 to 40, and, when used in a lithium secondary battery, has an advantage of having electrochemical stability even at a high voltage (5.0 V), but has a disadvantage of having very low ion conductivity at room temperature due to high crystallinity.

Accordingly, in order to overcome the disadvantage of a fluorine-based polymer, the present invention introduces a monomer unit comprising poly(alkylene oxide) having a lithium ion chelating property on a fluorine-based polymer having a high dielectric constant through a grafting reaction. In addition, for forming a stable protective layer that is not dissolved by an electrolyte liquid or does not cause side reactions, a polymer for an electrode protective layer including a polymer (A) formed by, in addition to the monomer unit comprising poly(alkylene oxide), further graft copolymerizing a monomer unit comprising a thermocurable functional group or a photocurable functional group is provided.

The fluorine-based polymer according to one embodiment of the present invention may be a polymer including a poly(chlorotrifluoroethylene) (PCTFE) polymerization unit, and the fluorine-based polymer may be a compound represented by the following Chemical Formula 1.

[Chemical Formula 1]

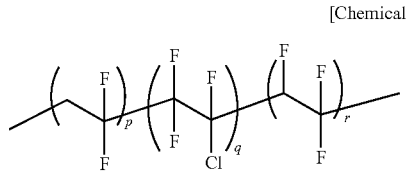

In Chemical Formula 1, p, q, and r are each independently $0 \leq p \leq 20,000$, $1 < q \leq 22,000$, and $0 \leq r \leq 15,000$.

The fluorine-based polymer according to one embodiment may include a dimer of vinylidene fluoride (VdF) and chlorotrifluoroethylene (CTFE), or a trimer of VDF, CTFE, and trifluoroethylene (TrFE), and the polymer may be required to include CTFE.

In order to enhance ion conductivity and electrochemical stability of the fluorine-based polymer, a monomer unit comprising poly(alkylene oxide) and a monomer unit comprising a thermocurable functional group or a photocurable functional group may be graft copolymerized, and one embodiment according to the present invention may be graft copolymerization using atomic transfer radical polymerization (hereinafter, ATRP).

The fluorine-based polymer according to the present invention is a polymer to which a branched chain can be grafted by the atomic transfer radical polymerization reaction, and any polymer may be used as long as it is such a polymer including a fluorine atom, however, polyvinylidene fluoride (PVdF), polyvinyl fluoride (PVF), polychlorotrifluoroethylene (PCTFE), polytetrafluoroethylene (PTFE), polytrifluoroethylene (PTrFE), poly-1,2-difluoroethylene, or a copolymer including two or more thereof is preferably used. Preferably, polychlorotrifluoroethylene (PCTFE), and more preferably, poly(vinylidene fluoride-chlorotrifluoroethylene) (hereinafter, P(VDF-CTFE)), or poly(vinylidene fluoride-chlorotrifluoroethylene-trifluoroethylene) (hereinafter, P(VDF-CTFE-TrFE)) may be used.

One embodiment of the present invention is capable of lowering crystallinity of a fluorine-based polymer electrolyte by introducing a chain including poly(alkylene oxide) having ion conductivity to a chlorine (Cl) group on the CTFE through atomic transfer radical polymerization, and accordingly, has an advantage of enhancing fluidity of the polymer chain. Moreover, by using a fluorine-based polymer having a high dielectric constant, more lithium ions are dissociated, and as a result, higher ion conductivity and electrochemical stability may be obtained compared to existing poly(alkylene oxide)-based polymers.

In addition, in order to secure physical, chemical and electrochemical strength, and stability of an electrode protective layer, the present invention provides a polymer having a monomer unit comprising a thermocurable functional group or a photocurable functional group further grafted in the polymer. The thermocurable functional group may enhance the properties by itself or by being thermally cured with proper multifunctional functional groups. In addition, the photocurable functional group may enhance the properties by itself or by being photocured with proper multifunctional vinyl-based functional groups under the presence of a photoinitiator.

In one embodiment of the present invention, a structure copolymerizing the monomer unit comprising poly(alkylene oxide), and the monomer unit comprising a thermocurable functional group or a photocurable functional group on the fluorine-based polymer may include a structure of the following Chemical Formula 2.

[Chemical Formula 2]

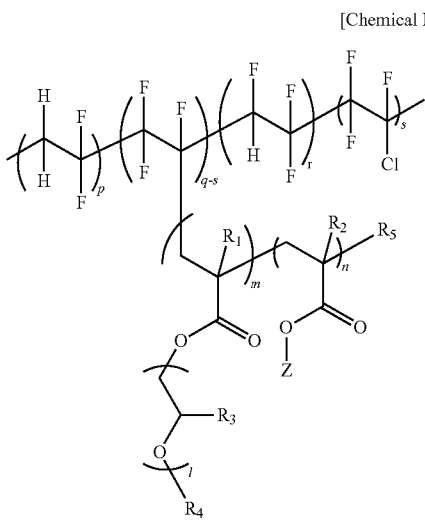

In Chemical Formula 2, p, q, r, and s are each independently $0 \leq p \leq 20,000$, $0 < q \leq 22,000$, $0 \leq r \leq 15,000$, and $0 \leq s < 22,000$, $R_1$, $R_2$, and $R_3$ are each independently hydrogen or methyl, $R_4$ is any one selected from the group consisting of hydrogen, an alkyl group having 1 to 12 carbon atoms, and a phenyl group unsubstituted or substituted with an alkyl group having 1 to 12 carbon atoms, Z is a curable functional group represented by the following Chemical Formula 3 or Chemical Formula 4, , m, and n are each independently $2 \leq l \leq 230$, $1 \leq m \leq 200$, and $2 \leq n \leq 50$, and $R_5$ is any one selected from the group consisting of hydrogen, chlorine, and bromine.

[Chemical Formula 3]

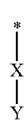

In Chemical Formula 3,

X is a single bond, or alkylene having 1 to 6 carbon atoms or phenylene,

Y is one or more functional groups selected from the group consisting of hydrogen, a hydroxyl group, an alkoxysilyl group, a phosphate group, a succinate group, a phthalate group, and an isocyanate group, and

* represents a bonding site directly bonding to O in Chemical Formula 2.

[Chemical Formula 4]

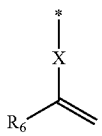

In Chemical Formula 4,

X is a single bond, or any one selected from the group consisting of alkylene having 1 to 12 carbon atoms, alkyleneoxycarbonyl having 1 to 12 carbon atoms

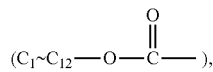

urethane group-containing alkyleneoxycarbonyl having 1 to 12 carbon atoms, and poly(ethylene oxide)carbonyl having an ethylene oxide repeating number of 1 to 10 and phenylene, and

* represents a bonding site directly bonding to O in Chemical Formula 2.

In addition, in one specific embodiment of the present invention, the polymer (A) may include a structure of the following Chemical Formula 5 or Chemical Formula 6.

[Chemical Formula 5]

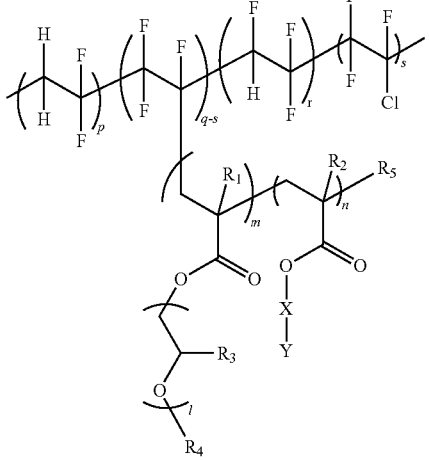

In Chemical Formula 5, p, q, r, and s are each independently $0 \leq p \leq 20,000$, $0 < q \leq 22,000$, $0 \leq r \leq 15,000$, and $0 \leq s < 22,000$, $R_1$, $R_2$, and $R_3$ are each independently hydrogen or methyl, $R_4$ is any one selected from the group consisting of hydrogen, an alkyl group having 1 to 12 carbon atoms, and a phenyl group unsubstituted or substituted with an alkyl group having 1 to 12 carbon atoms, X is a single bond, or alkylene having 1 to 6 carbon atoms or phenylene, Y is one or more functional groups selected from the group consisting of hydrogen, a hydroxyl group, an alkoxysilyl group, a phosphate group, a succinate group, a phthalate group, and an isocyanate group, l, m, and n are each independently $2 \leq l \leq 230$, $1 \leq m \leq 200$, and $2 \leq n \leq 50$, and $R_5$ is any one selected from the group consisting of hydrogen, chlorine, and bromine.

[Chemical Formula 6]

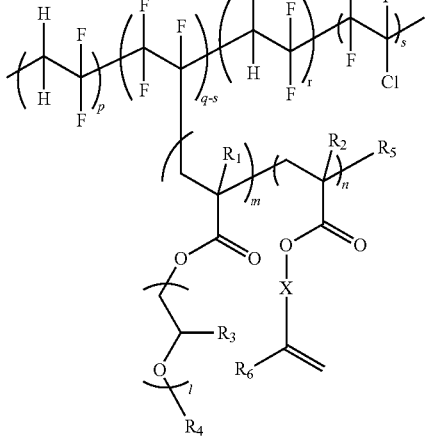

In Chemical Formula 6, p, q, r, and s are each independently $0 \leq p \leq 20,000$, $0 < q \leq 22,000$, $0 \leq r \leq 15,000$, and $0 \leq s < 22,000$, $R_1$, $R_2$, $R_3$, and $R_6$ are each independently hydrogen or methyl, $R_4$ is any one selected from the group consisting of hydrogen, an alkyl group having 1 to 12 carbon atoms, and a phenyl group unsubstituted or substituted with an alkyl group having 1 to 12 carbon atoms, X is a single bond, or any one selected from the group consisting of alkylene having 1 to 12 carbon atoms, alkyleneoxycarbonyl having 1 to 12 carbon atoms

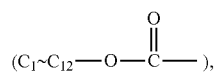

urethane group-containing alkyleneoxycarbonyl having 1 to 12 carbon atoms, and poly(ethylene oxide)carbonyl having an ethylene oxide repeating number of 1 to 10 and phenylene, l, m, and n are each independently $2 \leq l \leq 230$, $1 \leq m \leq 200$ and $2 \leq n \leq 50$, and $R_5$ is any one selected from the group consisting of hydrogen, chlorine, and bromine.

The monomer unit comprising poly(alkylene oxide) according to one embodiment of the present invention is a material capable of enhancing ion conductivity of a fluorine-based polymer, and the poly(alkylene oxide) may be poly(ethylene oxide) or poly(propylene oxide), and may preferably be poly(ethylene oxide). Examples of the monomer unit comprising poly(alkylene oxide) may include poly(alkylene oxide) (meth)acrylate, poly(alkylene oxide) monoalkyl ether (meth)acrylate, poly(alkylene oxide) monophenyl ether (meth)acrylate and the like, but are not limited thereto.

The monomer unit comprising a thermocurable functional group according to one embodiment of the present invention may include one or more functional groups selected from the group consisting of a carboxylic acid group, a hydroxyl group, an alkoxysilyl group, a phosphate group, a succinate group, a phthalate group, and an isocyanate group, and nonlimiting examples thereof may include (meth)acrylic acid, 2-hydroxyethyl (meth)acrylate, hydroxypropyl (meth)acrylate, 4-hydroxybutyl (meth)acrylate, (3-trialkoxysilyl)propyl (meth)acrylate, 3-(dialkoxysilyl)propyl (meth)acrylate, (meth)acryloyloxypropyl phosphate, (meth)acryloyloxyethyl isocyanate, 2-(meth)acryloyloxyethyl succinate, 2-(meth)acryloyloxyethyl phthalate, 2-(N,N-diethylamino)ethyl (meth)acrylate and the like, and preferably, 2-hydroxyethyl (meth)acrylate, 4-hydroxybutyl (meth)acrylate and (3-trialkoxysilyl)propyl (meth)acrylate may be included.

In addition, the monomer unit comprising a photocurable functional group according to one embodiment of the present invention may include an unsaturated vinyl group, and nonlimiting examples thereof may include vinyl group-containing (meth)acrylates such as vinyl (meth)acrylate, allyl (meth)acrylate, or 2-(vinyloxy)ethyl methacrylate.

The polymerization unit including the photocurable functional group may be secondarily induced from (meth)acrylate that does not contain a vinyl group through a polymer reaction (post-polymerization reaction). For example, a hydroxyl group-containing (meth)acrylate is copolymerized with the poly(alkylene oxide) group-containing monomer, and then condensed with 2-isocyanatoethyl (meth)acrylate to introduce a (meth)acrylate group on the side chain, and on the contrary, a (meth)acrylate including an isocyanate group is copolymerized with the poly(alkylene oxide) group-containing monomer, and then condensed with a hydroxyl group-containing (meth)acrylate. Types of the polymer reaction used for introducing a vinyl group on the side chain are not limited, and examples thereof may include an urethane-forming reaction of hydroxyl group-isocyanate group, and ester group-forming reaction of epoxy group-carboxylic acid group, an $S_N 2$ reaction of amine group-halogen group, and the like.

The monomer unit comprising the poly(alkylene oxide) and the monomer unit comprising a thermocurable functional group or a photocurable functional group may have a molar ratio of 99.9:0.1 to 70:30, and specifically, a molar ratio of 99:1 to 90:10. When the monomer unit comprising a thermocurable functional group or a photocurable functional group is included in less than the above-mentioned range, a crosslinking reaction between the polymers is not sufficient, and physical, chemical, and electrochemical strength and stability of the electrode protective layer are not sufficient, and the content being greater than the above-mentioned range may significantly decrease ion conductivity due to a small alkylene oxide content and too high polymer network density, and therefore, the content is properly controlled in the above-mentioned range.

In one embodiment of the present invention, the fluorine-based graft polymer (A) may further introduce a unit derived from a third monomer to the graft chain with the purpose of enhancing interfacial adhesion properties and mechanical properties of the electrode active material. Examples of the third monomer may include methyl (meth)acrylate, ethyl (meth)acrylate, n-propyl (meth)acrylate, isopropyl (meth)acrylate, n-butyl (meth)acrylate, t-butyl (meth)acrylate, pentyl (meth)acrylate, 2-ethylbutyl (meth)acrylate, 2-ethylhexyl (meth)acrylate, n-octyl (meth)acrylate, isooctyl (meth)acrylate, isononyl (meth)acrylate, lauryl (meth)acrylate, styrene, α-methylstyrene, p-methylstyrene, p-methoxystyrene, (meth)acrylonitrile and the like, but are not limited thereto.

The third monomer according to one embodiment of the present invention may be included in 1 part by weight to 20 parts by weight with respect to a total 100 parts by weight of the fluorine-based graft polymer (A). Improvements in target properties may be insignificant under 1 part by weight, and ion conductivity may become too low when including in greater than 20 parts by weight.

The fluorine-based polymer according to Chemical Formula 1 according to one embodiment of the present invention may be included in 5 parts by weight to 50 parts by weight, and preferably in 5 parts by weight to 40 parts by weight with respect to 100 parts by weight of the fluorine-based graft polymer (A). When the fluorine-based polymer content is greater than the above-mentioned range, mechanical strength and electrochemical stability of the electrode protective layer may increase, however, crystallinity of the fluorine-based polymer may not be suppressed and the alkylene oxide content excessively decreases reducing ion conductivity. When the fluorine-based polymer content is less than the above-mentioned range, properties of high electrochemical stability and high lithium ion dissociation of the fluorine-based polymer may not be obtained, and therefore, the content is properly selected in the above-mentioned range.

In addition, the present invention provides a polymer composition for an electrode protective layer including the polymer composition for an electrode protective layer and further including a multifunctional crosslinking agent having at least two or more functional groups capable of reacting with the thermocurable functional group included in the fluorine-based graft polymer (A).

The multifunctional crosslinking agent may further react with the thermocurable functional group Y included in the graft polymer of Chemical Formula 2 to form a crosslinked structure between the polymers. The electrode protective layer formed in a crosslinked structure has high chemical and electrochemical stability, and protects an electrode active material surface from side reactions with an electrolyte liquid, and thereby may overcome problems such as deterioration in the cycle properties and decrease in the Coulombic efficiency of a secondary battery.

Types of the multifunctional crosslinking agent are not particularly limited, and any one selected from the group consisting of an isocyanate crosslinking agent, an epoxy crosslinking agent, an aziridine crosslinking agent, an alcohol crosslinking agent, and an amine-based crosslinking agent may be used.

Specific examples of the isocyanate crosslinking agent may include diisocyanate compounds such as toluene diisocyanate, xylene diisocyanate, diphenylmethane diisocyanate, hexamethylene diisocyanate, isophorone diisocyanate, tetramethylxylene diisocyanate, or naphthalene diisocyanate, or compounds obtained by reacting the diisocyanate compound with a polyol, and examples of the polyol may include trimethylolpropane and the like.

In addition, specific examples of the epoxy crosslinking agent may include one or more selected from the group consisting of ethylene glycol diglycidyl ether, glycerol triglycidyl ether, trimethylolpropane triglycidyl ether, N,N,N',N'-tetraglycidyl ethylenediamine and glycerin diglycidyl ether, and specific examples of the aziridine crosslinking agent may include one or more selected form the group consisting of N,N'-toluene-2,4-bis(1-aziridinecarboxamide), N,N'-diphenylmethane-4,4'-bis(1-aziridinecarboxamide), triethylenemelamine, bisisophthaloyl-1-(2-methylaziridine) and tri-1-aziridinylphosphine oxide, however, the epoxy crosslinking agent and the aziridine crosslinking agent are not limited thereto. Specific examples of the alcohol crosslinking agent may include one or more selected from the group consisting of poly(alkylene glycol), glycerol, trismethylolpropane, pentaerythritol, and dipentaerythritol, but are not limited thereto. In addition, specific examples of the amine-based crosslinking agent may include one or more selected from the group consisting of ethylenediamine, diethylenetriamine, triethylenetetramine, or modified amines thereof, metaphenylenediamine, diaminodiphenylmethane, diaminodiphenylsulfone, or modified amines thereof, but are not limited thereto.

The multifunctional crosslinking agent may be included in a ratio of 0.1 parts by weight to 10 parts by weight, and preferably 0.5 parts by weight to 5 parts by weight with respect to 100 parts by weight of the fluorine-based graft polymer (A). By controlling the crosslinking agent content in the above-described range, properties of an electrolyte may be properly obtained at a target level.

In addition, the present invention provides a polymer composition for an electrode protective layer including the polymer composition for an electrode protective layer and further including a multifunctional vinyl-based crosslinking agent having a functional group capable of reacting with the photocurable functional group included in the fluorine-based graft polymer (A). The fluorine-based graft polymer (A) may be photocured by a vinyl group introduced on the side chain under the presence of a photoinitiator, but may be a polymer composition for photocuring further including a multifunctional vinyl-based crosslinking agent.

The multifunctional vinyl-based crosslinking agent may further react with an unsaturated vinyl functional group included in the graft polymer of Chemical Formula 2 to form a crosslinked structure between the polymers. The electrode protective layer formed in a crosslinked structure has high chemical and electrochemical stability, and protects an electrode active material surface from side reactions with an electrolyte liquid, and thereby may overcome problems such as deterioration in the cycle properties and decrease in the Coulombic efficiency of a secondary battery.

In one embodiment of the present invention, the multifunctional vinyl-based crosslinking agent is an organic compound having two or more vinyl groups in one molecule, and examples thereof may include one or more types of ethylene glycol di(meth)acrylate, 1,6-hexanediol di(meth)acrylate, tri(propylene glycol) di(meth)acrylate, tris(2-(meth)acryloethyl) isocyanate, trimethylolpropane tri(meth)acrylate, trimethylolpropane ethoxylate tri(meth)acrylate, pentaerythritol di(meth)acrylate, pentaerythritol tri(meth)acrylate, pentaerythritol tetra(meth)acrylate, dipentaerythritol di(meth)acrylate, dipentaerythritol tri(meth)acrylate, dipentaerythritol tetra(meth)acrylate, dipentaerythritol penta(meth)acrylate, dipentaerythritol hexa(meth)acrylate and the like, but are not limited thereto.

The multifunctional vinyl-based crosslinking agent may be included in a ratio of 0.1 parts by weight to 50 parts by weight, and preferably 0.5 parts by weight to 10 parts by weight with respect to 100 parts by weight of the fluorine-based graft polymer (A). By controlling the crosslinking agent content in the above-described range, properties of an electrolyte may be properly obtained at a target level.

In one embodiment of the present invention, as the photoinitiator, general initiators capable of initiating photopolymerization by generating radicals through irradiating ultraviolet rays or the like such as acetophenone-based compounds, biimidazole-based compounds, triazine-based compounds, oxime-based compounds, benzoin-based compounds, hydroxyketone-based compounds, aminoketone-based compounds, or phosphine oxide-based compounds may be used without limit.

The acetophenone-based compound usable as the photoinitiator is selected from the group consisting of 2-hydroxy-2-methyl-1-phenylpropan-1-one, 1-(4-isopropylphenyl)-2-hydroxy-2-methylpropan-1-one, 4-(2-hydroxyethoxy)-phenyl-(2-hydroxy-2-propyl)ketone, 1-hydroxycyclohexylphenylketone, benzoin methyl ether, benzoin ethyl ether, benzoin isobutyl ether, benzoin butyl ether, 2,2-dimethoxy-2-phenylacetophenone, 2-methyl-(4-methylthio)phenyl-2-morpholino-1-propan-1-one, 2-benzyl-2-dimethylamino-1-(4-morpholinophenyl)-butan-1-one, 2-(4-bromo-benzyl-2-dimethylamino-1-(4-morpholinophenyl)-butan-1-one, and 2-methyl-1-[4-(methylthio)phenyl]-2-morpholinopropan-1-one, the biimidazole-based compound is selected from the group consisting of 2,2-bis(2-chlorophenyl)-4,4',5,5'-tetraphenyl biimidazole, 2,2'-bis(o-chlorophenyl)-4,4',5,5'-tetrakis(3,4,5-trimethoxyphenyl)-1,2'-biimidazole, 2,2'-bis(2,3-dichlorophenyl)-4,4',5,5'-tetraphenyl biimidazole, and 2,2'-bis(o-chlorophenyl)-4,4,5,5'-tetraphenyl-1,2'-biimidazole, the triazine-based compound is selected from the group consisting of 3-{4-[2,4-bis(trichloromethyl)-s-triazin-6-yl]phenylthio}propionic acid, 1,1,1,3,3,3-hexafluoroisopropyl-3-{4-[2,4-bis(trichloromethyl)-s-triazin-6-yl]phenylthio}propionate, ethyl-2-{4-[2,4-bis(trichloromethyl)-s-triazin-6-yl]phenylthio}acetate, 2-epoxyethyl-2-{4-[2,4-bis(trichloromethyl)-s-triazin-6-yl]phenylthio}acetate, cyclohexyl-2-{4-[2,4-bis(trichloromethyl)-s-triazin-6-yl]phenylthio}acetate, benzyl-2-{4-[2,4-bis(trichloromethyl)-s-triazin-6-yl]phenylthio}acetate, 3-{chloro-4-[2,4-bis(trichloromethyl)-s-triazin-6-yl]

phenylthio}propionic acid, 3-{4-[2,4-bis(trichloromethyl)-s-triazin-6-yl]phenylthio}propionamide, 2,4-bis(trichloromethyl)-6-p-methoxystyryl-s-triazine, 2,4-bis(trichloromethyl)-6-(1-p-dimethylaminophenyl)-1,3-butadienyl-s-triazine, and 2-trichloromethyl-4-amino-6-p-methoxystyryl-s-triazine, and examples of the oxime-based compound may include 1,2-octadione-1-(4-phenylthio)phenyl-2-(o-benzoyloxime) (Ciba Geigy Ltd., CGI 124), and ethanone-1-(9-ethyl)-6-(2-methylbenzoyl-3-yl)-1-(o-acetyloxime) (CGI 242), oxime OX-03 (Ciba Geigy Ltd.), NCI-831 (Adeka Corporation), PI-102 (LG Chem.), PBG 304, PBG 305, PBG 3057 (Tronly) and the like.

In addition, α-hydroxyketone-based compounds (ex. IRGACURE 184, IRGACURE 500, IRGACURE 2959, DAROCUR 1173; manufactured by Ciba Specialty Chemicals); phenyl glyoxylate-based compounds (ex. IRGACURE 754, DAROCUR MBF; manufactured by Ciba Specialty Chemicals); benzyl dimethyl ketal-based compounds (ex. IRGACURE 651; manufactured by Ciba Specialty Chemicals); α-aminoketone-based compounds (ex. IRGACURE 369, IRGACURE 907, IRGACURE 1300; manufactured by Ciba Specialty Chemicals); monoacylphosphine-based compounds (MAPO) (ex. DAROCUR TPO; manufactured by Ciba Specialty Chemicals); bisacylphosphine-based compounds (BAPO) (ex. IRGACURE 819, IRGACURE 819DW; manufactured by Ciba Specialty Chemicals); phosphine oxide-based compounds (ex. IRGACURE 2100; manufactured by Ciba Specialty Chemicals); metallocene-based compounds (ex. IRGACURE 784; manufactured by Ciba Specialty Chemicals); iodonium salts (ex. IRGACURE 250; manufactured by Ciba Specialty Chemicals); and a mixture of two or more thereof may be included as an example, however, the photoinitiator is not limited thereto.

The photoinitiator content may be from 0.01 parts by weight to 5 parts by weight and preferably from 0.1 parts by weight to 1 part by weight based on a total 100 parts by weight of the polymer (A) and the multifunctional vinyl-based crosslinking agent, but is not limited thereto. When the photoinitiator content is 0.01 or less, curing may not be sufficiently obtained, and an electrode protective layer having target properties may not be obtained, and therefore, the content is properly controlled in the above-mentioned range.

<Method for Preparing Graft Polymer>

A method for preparing a polymer for an electrode protective layer according to the present invention may include mixing, polymerizing, and, selectively, polymer reacting.

In the method, the mixing may be forming a mixture by mixing a raw material for preparing a polymer in which a monomer unit comprising poly(alkylene oxide) and a monomer unit comprising a thermocurable functional group are grafted on a fluorine-based polymer, or a raw material for preparing a polymer in which a monomer unit comprising poly(alkylene oxide) and a monomer unit comprising a photocurable functional group or a monomer unit comprising a functional group capable of introducing a photocurable functional group in the polymer reacting are grafted, and the mixing, which is one example, may be mixing a fluorine-based polymer, the monomer to polymerize, and a solvent. After that, mixing a catalyst and a ligand with the solvent may be further included.

The fluorine-based polymer is a part becoming a main chain of the grafted polymer (A), and specific examples thereof may be the same as described above, and, as one embodiment according to the present invention, may include poly(vinylidene-co-chlorotrifluoroethylene) (hereinafter, P(VDF-co-CTFE)). In one embodiment of the present invention, the monomer unit comprising poly(alkylene oxide), and the monomer having a thermocurable functional group or a photocurable functional group may be poly(ethylene glycol) monomethyl ether methacrylate (hereinafter, mPEGMA) and 2-hydroxyethyl methacrylate (hereinafter, HEMA).

As the solvent, various solvents known in the art may be used, and for example, N-methyl-2-pyrrolidone (NMP), gamma-butyrolactone (GBL), dimethylformamide (DMF), dimethyl sulfoxide (DMSO), dimethylacetamide (DMAc), acetonitrile (AcCN), tetrahydrofuran (THF) or the like may be used, however, the solvent is not limited thereto.

To the mixture solution, a catalyst and a ligand may be further mixed with the solvent.

Examples of the catalyst may include $Cu(I)Cl$, $Cu(II)Cl_2$, $Cu(I)Br$, $Cu(II)Br_2$, $Fe(II)Cl_2$, $Fe(III)Cl_3$ or mixtures thereof, and preferably, $Cu(I)Cl$, $Cu(II)Cl_2$, $Cu(I)Br$, $Cu(II)Br_2$ or mixtures thereof may be included as an example.

In addition, the catalyst content may be from 0.0001 parts by weight to 1 part by weight, 0.0005 parts by weight to 0.5 parts by weight, or 0.001 parts by weight to 0.1 parts by weight with respect to 100 parts by weight of the monomer mixture. When the catalyst content is less than 0.0001 parts by weight, the reaction rate is very delayed, and when greater than 1 part by weight, problems such as gelation before producing the polymerized graft polymer or very difficult catalyst removal occur, and therefore, the content is properly selected in the above-mentioned range.

The ligand is not particularly limited as long as it is usable in a polymerization reaction by bonding to the catalyst.

As one example, the ligand may include ligands having one or more nitrogen, oxygen, phosphorous, and sulfur atoms that may coordinate to the catalyst through 6-bonds or ligands having two or more carbon atoms that may coordinate to the catalyst through n-bonds, but is not limited thereto. Specifically, one or more types selected from the group consisting of N,N,N',N'''',N''''-pentamethyldiethylenetriamine (PMDETA), 2,2'-bipyridine (bpy), 4,4'-di-5-nonyl-2,2'-bipyridine (dNbpy), tris (2-pyridylmethyl)amine (TPMA), and tris(2-dimethylaminoethyl)amine (Me6TREN) may be used, however, the ligand is not limited thereto.

The ligand content may be from 50 parts by weight to 2000 parts by weight, 100 parts by weight to 1000 parts by weight, or 200 parts by weight to 500 parts by weight with respect to 100 parts by weight of the catalyst. When the ligand content is less than 50 parts by weight, metal complex formation obtained by bonding with the catalyst is too little resulting in very slow or no reaction, and the ligand content being greater than 2000 parts by weight may increase manufacturing costs and cause concern of side reactions caused by an excessive ligand use.

The ATRP reaction may use a catalyst reducing agent as necessary. Examples of the reducing agent may include an organic reducing agent, an inorganic reducing agent, a radical generator and the like, but are not limited thereto.

When the catalyst, the ligand, and, as necessary, the catalyst reducing agent of the ATRP reaction are mixed and stirred at 30° C. to 100° C., the ATRP reaction occurs, and a grafted polymer may be obtained.

The polymer reacting is a step required when using a monomer including a functional group capable of introducing a photocurable functional group in the mixing, and may be included when the photocurable vinyl-based monomer has a high risk of producing a gelation reaction in the polymerizing. In the polymer reacting, a proper condensation reaction condition may be selected depending on the grafted polymer prepared in the ATRP reacting and the types of the functional group as a condensation reaction of the monomer compound. As a specific example, when the monomer used in the mixing is an alcohol group-containing monomer such as 2-hydroxyethyl methacrylate, a (meth) acrylate group may be introduced in the polymer reacting through condensation with an isocyanate-containing (meth) acrylate compound. Herein, the reaction temperature may be selected in a range of 40° C. to 100° C., and selectively, the reaction may be facilitated using a catalyst such as dibutyltin dilaurate.

The polymer according to one embodiment of the present invention may be PVDF-co-(PCTFE-g-(mPEGMA-co-HEMA)).

In addition, the polymer according to one embodiment of the present invention may be PVDF-co-(PCTFE-g-(mPEGMA-co-HEMA-AOI)), a compound obtained by preparing PVDF-co-(PCTFE-g-(mPEGMA-co-HEMA)) using the ATRP method, and then introducing a (meth)acrylate group on the side chain through a polymer reaction between the graft polymer and 2-isocyanatoethyl acrylate or 2-(acryloyloxy)ethyl isocyanate (AOI).

After the grafting polymerization reaction, removing the unreacted monomer by precipitating the produced polymer in a proper nonsolvent may be further included. After that, the polymer is dried under a vacuum condition to obtain the fluorine-based graft polymer (A) according to the present invention.

<Method for Forming Electrode Protective Layer>

The electrode protective layer according to the present invention specifically means an electrode protective layer for resolving the above-described problems by being coated on at least one surface of an electrode active material or metal lithium, and the forming method of the electrode protective layer may include the following steps: introducing a multifunctional crosslinking agent to the fluorine-based graft polymer (A) or the fluorine-based graft polymer (A)-dissolved solution in a ratio of 0.1 parts by weight to 10 parts by weight or 0.1 parts by weight to 6 parts by weight with respect to 100 parts by weight of the whole fluorine-based graft polymer (A), properly diluting the result in a solvent, and stirring the result for 1 hour to 6 hours. After that, the solution is mixed with an active material to coat to prepare a paste or coated on a foil-type electrode surface, heat treated for 1 minute to 12 hours at 50° C. to 150° C., and then cured and dried to be prepared. On the coating film-formed active material, a vacuum drying process or a heating process may be further conducted to remove the residual solvent.

Alternatively, the forming method of the electrode protective layer may include the following steps: introducing a multifunctional vinyl-based crosslinking agent to the fluorine-based graft polymer (A) or the fluorine-based graft polymer (A)-dissolved solution in a ratio of 0.1 parts by weight to 50 parts by weight with respect to 100 parts by weight of the whole fluorine-based graft polymer (A), introducing a photoinitiator in a ratio of 0.01 parts by weight to 5 parts by weight with respect to a total 100 parts by weight of the fluorine-based graft polymer (A) and the multifunctional vinyl-based crosslinking agent, properly diluting the result in a solvent, and stirring the result for 1 hour to 6 hours. After that, the solution is mixed with an active material to coat to prepare a paste or coated on a foil-type electrode surface, photocured by irradiating ultraviolet (UV) rays thereon, and then a vacuum drying process or a heating process may be further conducted to remove the residual solvent.

According to one embodiment of the present invention, the protective layer-formed electrode may include an electrode active material, and the electrode active material may be any one selected from the group consisting of metal lithium, a positive electrode active material, and a negative electrode active material.

<Lithium Secondary Battery>

In addition, the present invention provides a lithium secondary battery including an electrode (positive electrode and negative electrode) having a protective layer formed using the polymer composition for an electrode protective layer, a separator provided between the negative electrode and the positive electrode, and an electrolyte.

The positive electrode of the present invention may be prepared by, for example, preparing a mixture of a positive electrode active material, a conductor, and a binder in a slurry form, coating the slurry on a positive electrode current collector, and drying the result, and as necessary, a filler may be further added to the mixture.

The positive electrode active material is not limited as long as it is commonly used in the art, and examples thereof may include compounds having a lithium intercalation material as a main component such as layer compounds or compounds substituted with one or more transition metals such as lithium cobalt oxide ($LiCoO_2$) or lithium nickel oxide ($LiNiO_2$); lithium manganese oxide ($LiMnO2$); lithium copper oxide ($Li2CuO2$); vanadium oxide; nickel site-type lithium nickel oxide (lithiated nickel oxide); lithium manganese composite oxide, disulfide compounds, or composite oxides formed by combining these.

As the positive electrode current collector, those having a thickness of 3 μm to 500 μm may be generally used, and the positive electrode current collector is not particularly limited as long as it has high conductivity without inducing chemical changes to the corresponding battery. For example, stainless steel, aluminum, nickel, titanium, baked carbon, or aluminum or stainless carbon of which surface is treated with carbon, nickel, titanium, silver or the like may be used.

The positive electrode active material slurry may be prepared by adding a binder, a conductor, a filler, and an additive such as a dispersant to the positive electrode active material, and mixing the result.

The binder is a component assisting binding of the positive electrode active material and the conductor, and binding for the positive electrode current collector, and is normally added in 1% by weight to 30% by weight based on the total weight of the positive electrode active material. Such a binder is not particularly limited, and those known in the art may be commonly used, and examples thereof may include one type selected from the group consisting of a vinylidene fluoride-hexafluoropropylene copolymer (PVBF-co-HEP), polyvinylidene fluoride, polyacrylonitrile, polymethyl methacrylate, polyvinyl alcohol, carboxymethylcellulose (CMC), starch, hydroxypropylcellulose, regenerated cellulose, polyvinyl pyrrolidone, polytetrafluoroethylene, polyethylene, polypropylene, polyacrylic acid, an ethylene-propylene-diene monomer (EPDM), a sulfonated EPDM, styrene-butadiene rubber (SBR) and fluoro rubber, or a mixture of two or more types thereof.

The conductor may be normally added in 0.05% by weight to 5% by weight based on the total weight of the positive electrode active material. Such a conductor is not particularly limited as long as it has conductivity without inducing side reaction with other components of a battery, and examples thereof may include graphite such as natural graphite or artificial graphite; carbon black such as carbon black (super-p), acetylene black, ketjen black, channel black, furnace black, lamp black, or thermal black; conductive fibers such as carbon fiber or metal fibers; fluorocarbon; metal powders such as aluminum and nickel powder; conductive whiskers such as zinc oxide or potassium titanate; conductive metal oxides such as titanium oxide; conductive materials such as polyphenylene derivatives.

The filler is a component suppressing positive electrode expansion, and may be used as needed, and is not particularly limited as long as it is a fibrous material without inducing chemical changes to the corresponding battery. Examples thereof may include olefin-based polymers such as polyethylene or polypropylene; or fibrous materials such as glass fiber or carbon fiber.

The dispersant (dispersion liquid) is not particularly limited, and examples thereof may include isopropyl alcohol, N-methyl pyrrolidone (NMP), acetone and the like.

The coating may be conducted using methods commonly known in the art, and for example, may be conducted by distributing the positive electrode active material slurry on one side of the positive electrode current collector, and then uniformly dispersing the result using a doctor blade and the like. In addition thereto, the coating may be conducted using a method such as die casting, comma coating, or screen printing.

The drying is not particularly limited, and may be conducted in a vacuum oven of 50° C. to 200° C. for within one day.

The negative electrode of the present invention may be prepared by, for example, coating a mixture of a negative electrode active material, a conductor, and a binder on a negative electrode current collector, and then drying the result, and as necessary, a filler may be further added to the mixture.

As the negative electrode active material, compounds capable of reversibly intercalating or deintercalating lithium may be used. Specific examples thereof may include carbon materials such as artificial graphite, natural graphite, graphited carbon fiber, or amorphous carbon; metal capable of alloying with lithium or alloy thereof such as Si, Al, Sn, Pb, Zn, Bi, In, Mg, Ga, Cd, Si alloys, Sn alloys, or Al alloys; metal oxides capable of doping of de-doping lithium such as $SiO_x$ ($0<x<2$), $SnO_2$, vanadium oxide, or lithium vanadium oxide; or composites including the metal or alloy thereof and carbon materials such as Si—C composites or Sn—C composites, and among these, one type alone or a mixture of two or more types may be used. In addition, a metal lithium thin film may also be used as the negative electrode active material. In addition, both low-crystalline carbon and high-crystalline carbon may be used as the carbon material. Representative examples of the low-crystalline carbon may include soft carbon and hard carbon, and representative examples of the high crystalline carbon may include high temperature baked carbon such as amorphous, plate-type, scaly, spherical or fibrous natural graphite or artificial graphite, Kish graphite, pyrolytic carbon, mesophase pitch based carbon fiber, meso-carbon microbeads, Mesophase pitches and petroleum or coal tar pitch derived cokes.

A binder, a conductor, a filler and an additive such as a dispersant used in the negative electrode may be the same as or included in those used for preparing the positive electrode described above.

The separator may be an insulating thin film having high ion permeability and mechanical strength, and may generally have a pore diameter of 0.01 μm to 10 μm, and a thickness of 5 μm to 300 μm. As such a separator, porous polymer films, for example, porous polymer films prepared with a polyolefin-based polymer such as an ethylene homopolymer, a propylene homopolymer, an ethylene/butene copolymer, an ethylene/hexene copolymer, and an ethylene/methacrylate copolymer may be used either alone or as a laminate thereof, or common porous non-woven fabrics, for example, non-woven fabrics made of high melting point glass fiber, polyethylene terephthalate fiber and the like may be used, however, the separator is not limited thereto.

In addition, the electrolyte may include an organic solvent and a lithium salt commonly used in an electrolyte, and is not particularly limited.

The lithium salt may be used without particular limit as long as it is a compound capable of providing lithium ions used in a lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $LiI$, or $LiB(C_2O_4)_2$ and the like may be used as the lithium salt. The lithium salt concentration is preferably in a range of 0.1 M to 2.0 M. When the lithium salt concentration is included in the above-mentioned range, excellent electrolyte performance may be obtained since the electrolyte has proper conductivity and viscosity, and lithium ions may effectively migrate.

Representatives examples of the organic solvent may include one or more types selected from the group consisting of propylene carbonate, ethylene carbonate, diethyl carbonate, dimethyl carbonate, ethylmethyl carbonate, methylpropyl carbonate, dipropyl carbonate, dimethyl sulfoxide, acetonitrile, dimethoxyethane, diethoxyethane, vinylene carbonate, sulfolane, gamma-butyrolactone, propylene sulfite, and tetrahydrofuran.

Particularly, among the carbonate-based organic solvents, ethylene carbonate and propylene carbonate that are cyclic carbonate may be preferably used since they are a high viscosity organic solvent and have a high dielectric constant and thereby favorably dissociate the lithium salt in the electrolyte, and when such cyclic carbonate is mixed with low viscosity and low dielectric constant linear carbonate such as dimethyl carbonate and diethyl carbonate in a proper ratio and used, an electrolyte liquid having high electrical conductivity may be prepared, which is more preferably used.

The lithium secondary battery of the present invention may be manufactured by forming an electrode assembly by disposing a separator between a positive electrode and a negative electrode, placing the electrode assembly in a cylindrical battery case or a square battery case, and injecting an electrolyte thereinto. Alternatively, the lithium secondary battery of the present invention may also be manufactured by laminating the electrode assembly, and then impregnating the assembly into an electrolyte, and placing an obtained product in a battery case and sealing the case.

As the battery case used in the present invention, those commonly used in the art may be used, and appearances of the battery is not limited by battery applications. For example, a cylinder-type, a square-type, a pouch-type, a coin-type using a can, and the like, may be included.

The lithium secondary battery according to the present invention may be used not only in a battery cell used as a power supply of a small device, but as a unit cell of a medium-to-large sized battery module including a plurality of battery cells. Preferred examples of the medium-to-large sized device may include electric vehicles, hybrid electric vehicles, plug-in hybrid electric vehicles, systems for power storage and the like, but are not limited thereto.

Hereinafter, the present invention will be described in detail with reference to examples. However, the examples according to the present invention may be modified to various other forms, and the scope of the present invention is not to be construed as being limited to the examples described below. Examples of the present invention are provided in order to more fully describe the present invention to those having average knowledge in the art.

EXAMPLE

Preparation Example (1-1) Preparation of Grafting Copolymerized PVDF-Co-(PCTFE-g-(mPEGMA-Co-HEMA)) (A1-1)

In a 1000 ml flask, 10 g of P(VDF-co-CTFE) having a weight average molecular weight (hereinafter, Mw) of 600,000 as a fluorine-based polymer, and 116 g of poly(ethylene glycol) monomethyl ether methacrylate (mPEGMA, ethylene oxide repeating number=9), and 3.35 g of 2-hydroxyethyl methacrylate (HEMA), as monomers to polymerize, were introduced to 450 ml of a dimethyl sulfoxide (DMSO) solvent, and were stirred for 1 hour under the nitrogen condition.

After that, 0.003 g of $CuCl_2$ as an ATRP reaction catalyst, 0.014 g of TPMA as a ligand, and 0.25 g of tin(II) 2-ethylhexanoate $(Sn(EH)_2)$ as a reducing agent were introduced to the flask, and the ATRP reaction was proceeded for 30 hours at 60° C. under the nitrogen condition with stirring. Herein, the monomer conversion was 65%.

After the reaction was completed, a produced polymer was reprecipitated in a diethyl ether solvent to remove the unreacted monomers. The finally obtained polymer was dried for 24 hours under the vacuum condition to obtain a PVDF-co-(PCTFE-g-(mPEGMA-co-HEMA)) polymer (A1-1) having a fluorine-based chain content of 11%.

Preparation Example (1-2) Preparation of Grafting Copolymerized PVDF-Co-(PCTFE-g-P(mPEGA-Co-HBA)) (A1-2)

In a 1000 ml flask, 20 g of P(VDF-co-CTFE) having a weight average molecular weight (hereinafter, Mw) of 600,000 as a fluorine-based polymer, and 112 g of poly(ethylene glycol)monomethyl ether acrylate (mPEGA, ethylene oxide repeating number=9), and 3.65 g of 4-hydroxybutyl acrylate (HBA), as monomers to polymerize, were introduced to 480 ml of a DMSO solvent, and were stirred for 1 hour under the nitrogen condition.

After that, 0.003 g of $CuCl_2$ as an ATRP reaction catalyst, 0.014 g of TPMA as a ligand, and 0.04 g of azobisisobutyronitrile (AIBN) as a reducing agent were introduced to the flask, and the ATRP reaction was proceeded for 30 hours at 60° C. under the nitrogen condition with stirring. Herein, the monomer conversion was 80%.

After the reaction was completed, a produced polymer was reprecipitated in an ether solvent to remove the unreacted monomers. The finally obtained polymer was vacuum dried for 24 hours at room temperature to obtain a PVDF-co-(PCTFE-g-(mPEGA-co-HBA))-polymer (A1-2) having a fluorine-based chain content of 17%.

Preparation Example (1-3) Preparation of Grafting Copolymerized PVDF-Co-(PCTFE-g-P(mPEGMA-Co-TMSPMA))-Co-PTrFE (A1-3)

In a 1000 ml flask, 10 g of P(VDF-co-CTFE-co-TrFE) having a weight average molecular weight (Mw) of 560,000 as a fluorine-based polymer, and 108 g of mPEGMA (ethylene oxide repeating number=9), and 0.54 g of 3-(trimethoxysilyl)propyl methacrylate (TMSPMA), as monomers to polymerize, were introduced to 350 ml of a dimethylformamide (DMF) solvent, and were stirred for 1 hour under the nitrogen condition.

After that, 0.003 g of $CuCl_2$ as an ATRP reaction catalyst, 0.014 g of TPMA as a ligand, and 0.3 g of tin(II) 2-ethylhexanoate $(Sn(EH)_2)$ as a reducing agent were introduced to the flask, and the ATRP reaction was proceeded for 30 hours at 60° C. under the nitrogen condition with stirring. Herein, the monomer conversion was 74%.

After the reaction was completed, a produced polymer was reprecipitated in a diethyl ether solvent to remove the unreacted monomers. The finally obtained polymer was vacuum dried for 24 hours at room temperature to obtain a PVDF-co-(PCTFE-g-(mPEGMA-co-TMSPMA))-co-PTrFE polymer (A1-3) having a fluorine-based chain content of 11%.

Comparative Preparation Example (1-1) Preparation of P(mPEGMA-co-HEMA) Not Containing Fluorine-Based Chain (B1-1)

In a 1000 ml flask, 116 g of mPEGMA (ethylene oxide repeating number=9) and 3.35 g of HEMA were introduced to 350 ml of a DMSO solvent, and were stirred for 1 hour under the nitrogen condition. 0.10 g of AIBN was introduced thereto as a radical initiator, and the polymerization reaction was proceeded for 20 hours at 60° C. under the nitrogen atmosphere with stirring.

After the reaction was completed, a produced polymer was reprecipitated in a diethyl ether solvent to remove the unreacted monomers. The finally obtained polymer was vacuum dried for 24 hours at room temperature to obtain a P(mPEGMA-co-HEMA) polymer (B1-1) that does not contain a fluorine-based chain.

Preparation Examples 1-1 to 1-3 and Comparative Preparation Example 1-1 are shown in the following Table 1.

TABLE 1

| Polymer | Molar Ratio of mPEG(M)A: Thermocurable Monomer | Fluorine-Based chain Content in Polymer | Thermocurable Functional Group Type | Mw (PDI) |
|---|---|---|---|---|
| A1-1 | 90:10 | 11% | Hydroxy | $1.7 \times 10^6$ (6.2) |
| A1-2 | 90:10 | 17% | Hydroxy | $1.15 \times 10^6$ (4.5) |
| A1-3 | 99:1 | 11% | Trimethoxysilyl | $1.06 \times 10^6$ (3.4) |
| B1-1 | 90:10 | 0% | Hydroxy | $1.7 \times 10^5$ (2.9) |

(PDI: Polydispersity Index)

Preparation Example (2-1) Preparation of Grafting Copolymerized PVDF-Co-(PCTFE-g-(mPEGMA-Co-(HEMA-AOI))) (A2-1)

In a 1000 ml flask, 15 g of P(VDF-co-CTFE) having a weight average molecular weight (hereinafter, Mw) of 600,000 as a fluorine-based polymer, and 116 g of poly(ethylene glycol) monomethyl ether methacrylate (mPEGMA, ethylene oxide repeating number=9), and 3.35 g of 2-hydroxyethyl methacrylate (HEMA), as monomers to polymerize, were introduced to 450 ml of a dimethyl sulfoxide (DMSO) solvent, and were stirred for 1 hour under the nitrogen condition.

After that, 0.003 g of $CuCl_2$ as an ATRP reaction catalyst, 0.014 g of TPMA as a ligand, and 0.04 g of azobisisobutyronitrile (AIBN) as a reducing agent were introduced to the flask, and the ATRP reaction was proceeded for 30 hours at 60° C. under the nitrogen condition with stirring. Herein, the monomer conversion rate was 82%.

After the polymerization was completed, the reaction material was cooled to room temperature, and air was bubbled into the reaction vessel for 2 hours. 0.002 g of 2,6-bis(1,1-dimethylethyl)-4-methylphenol (BHT) was introduced thereto as a thermal polymerization inhibitor, and after heating the reaction material to 50° C., 4.36 g of 2-isocyanatoethyl acrylate (AOI), and 0.16 g of dibutyltin dilaurate (DBTDL) as a condensation catalyst were introduced thereto. The result was reacted for 24 hours under the presence of oxygen, and then the reaction was terminated. Using the above-described method, a mixture solution of a PVDF-co-(PCTFE-g-(mPEGMA-co-(HEMA-AOI))) polymer having a fluorine-based chain content of 11% and the monomers was obtained. The unreacted residual monomer was included in a polymer network in a photopolymerization process afterward.

Preparation Example (2-2) Preparation of Grafting Copolymerized PVDF-Co-(PCTFE-g-P(mPEGA-Co-HBA-AOI)) (A2-2)

In a 1000 ml flask, 20 g of P(VDF-co-CTFE) having a weight average molecular weight (hereinafter, Mw) of 600,000 as a fluorine-based polymer, and 112 g of polyethylene glycol monomethyl ether acrylate (mPEGA, ethylene oxide repeating number=9), and 3.65 g of 4-hydroxybutyl acrylate (HBA), as monomers to polymerize, were introduced to 480 ml of a DMSO solvent, and were stirred for 1 hour under the nitrogen condition.

After that, 0.003 g of $CuCl_2$ as an ATRP reaction catalyst, 0.014 g of TPMA as a ligand, and 0.04 g of AIBN as a reducing agent were introduced to the flask, and the ATRP reaction was proceeded for 30 hours at 60° C. under the nitrogen condition with stirring. Herein, the monomer conversion rate was 80%.

After the polymerization was completed, the reaction material was cooled to room temperature, and air was bubbled into the reaction vessel for 2 hours. 0.002 g of 2,6-bis(1,1-dimethylethyl)-4-methylphenol (BHT) was introduced thereto as a thermal polymerization inhibitor, and after heating the reaction material to 50° C., 4.35 g of 2-isocyanatoethyl acrylate (AOI), and 0.16 g of dibutyltin dilaurate (DBTDL) as a condensation catalyst were introduced thereto. The result was reacted for 24 hours under the presence of oxygen, and then the reaction was terminated. Using the above-described method, a mixture solution of a PVDF-co-(PCTFE-g-(mPEGA-co-(HBA-AOI))) polymer having a fluorine-based chain content of 15% and the monomers was obtained. The unreacted residual monomer was included in a polymer network in a photopolymerization process afterward.

Preparation Example (2-3) Preparation of Grafting Copolymerized PVDF-Co-(PCTFE-g-P(mPEGMA-Co-(HEMA-AOI)))-Co-PTrFE (A2-3)

In a 1000 ml flask, 15 g of P(VDF-co-CTFE-co-TrFE) having a weight average molecular weight (Mw) of 560,000 as a fluorine-based polymer, and 116 g of mPEGMA (ethylene oxide repeating number=9), and 0.70 g of HEMA, as monomers to polymerize, were introduced to 350 ml of a dimethylformamide (DMF) solvent, and were stirred for 1 hour under the nitrogen condition.

After that, 0.003 g of $CuCl_2$ as an ATRP reaction catalyst, 0.014 g of TPMA as a ligand, and 0.04 g of AIBN as a reducing agent were introduced to the flask, and the ATRP reaction was proceeded for 30 hours at 60° C. under the nitrogen condition with stirring. Herein, the monomer conversion rate was 80%.

After the polymerization was completed, the reaction material was cooled to room temperature, and air was bubbled into the reaction vessel for 2 hours. 0.0004 g of 2,6-bis(1,1-dimethylethyl)-4-methylphenol (BHT) was introduced thereto as a thermal polymerization inhibitor, and after heating the reaction material to 50° C., 0.84 g of 2-isocyanatoethyl acrylate (AOI), and 0.031 g of dibutyltin dilaurate (DBTDL) as a condensation catalyst were introduced thereto. The result was reacted for 24 hours under the presence of oxygen, and then the reaction was terminated. Using the above-described method, a mixture solution of a PVDF-co-(PCTFE-g-(mPEGMA-co-(HHEMA-AOI)))-co-PTrFE polymer having a fluorine-based chain content of 11% and the monomers was obtained. The unreacted residual monomer was included in a polymer network in a photopolymerization process afterward.

Comparative Preparation Example (2-1) Preparation of P(mPEGMA-co-(HEMA-AOI)) Not Containing Fluorine-Based Chain (B2-1)

In a 1000 ml flask, 116 g of mPEGMA (ethylene oxide repeating number=9) and 3.35 g of HEMA were introduced to 350 ml of a DMSO solvent, and were stirred for 1 hour under the nitrogen condition. 0.10 g of AIBN was introduced thereto as a radical initiator, and the polymerization reaction was proceeded for 20 hours at 60° C. under the nitrogen atmosphere with stirring. After that, the process was conducted in the same manner as in Preparation Example 1 to obtain a mixture solution of a P(mPEGMA-co-(HEMA-AOI))) polymer and the monomers (B2-1).

Comparative Preparation Example (2-2) Preparation of Grafting Copolymerized PVDF-co-(PCTFE-g-P(mPEGMA-co-HEMA)) Not Containing Photocurable Vinyl-Based Side Chain (B2-2)

A graft polymerization was conducted in the same manner as in Preparation Example 1 using 15 g of P(VDF-co-CTFE) having a weight average molecular weight (hereinafter, Mw) of 600,000 as a fluorine-based polymer, and 116 g of mPEGMA (ethylene oxide repeating number=9) and 3.35 g of HEMA, as monomers to polymerize, with 450 ml of a DMSO solvent, and, without a polymer reaction introducing a vinyl group on the side chain, a mixture solution of a PCTFE-g-P(mPEGMA-co-HEMA) and the unreacted monomers (B2-2) was obtained.

Preparation Examples 2-1 to 2-3 and Comparative Preparation Examples 2-1 and 2-2 are shown in the following Table 2.

TABLE 2

| Polymer | Poly(alkylene oxide):Vinyl-Based Side Chain[1] | Fluorine-Based Polymer Content[2] | Mw (PDI[3]) |
|---|---|---|---|
| A2-1 | 90:10 | 11% | $1.6 \times 10^6$ (5.9) |
| A2-2 | 90:10 | 15% | $1.15 \times 10^6$ (4.5) |
| A2-3 | 98:2 | 11% | $1.55 \times 10^6$ (5.5) |
| B2-1 | 90:10 | 0% | $1.7 \times 10^5$ (2.9) |
| B2-2 | 90:0[4] | 11% | $1.6 \times 10^6$ (5.9) |

*[1]molar ratio of poly(alkylene oxide)-containing polymerization unit: photocurable vinyl-based side chain-containing polymerization unit
*[2]content of fluorine-based main chain with respect to a sum of graft polymer and residual monomer
*[3]polydispersity index, Mw/Mn
*[4]molar ratio of poly(alkylene oxide)-containing polymerization unit:hydroxy-containing polymerization unit = 90:10

Examples 1-1 to 1-5 Preparation of Cured Electrode Protective Layer

Each of the fluorine-based graft polymers prepared in Preparation Examples 1-1 to 1-3 was mixed in a weight ratio (pt) as written in Table 3, and stirred for 6 hours to prepare a thermocurable polymer solution. The solution was coated on a 2 cm²×0.1 cm circular SUS substrate in a dry room, heated for 5 hours at a temperature of 60° C. for drying, and further thermally cured for 2 hours at 120° C. After that, the result was vacuum dried for 48 hours at 60° C. to prepare a completely dried polymer electrode protective layer. The amount of the coated polymer solution was adjusted so that a thickness of the final electrode protective layer becomes approximately 100 μm.

Comparative Examples 1-1 to 1-3 Preparation of Cured Polymer Film

The polymer prepared in Comparative Preparation Example 1-1 and a P(VDF-CTFE) copolymer was mixed in a composition as in Table 3, and stirred for 6 hours to prepare a homogeneous solution. After that, the same cured film preparation method as the example was used to prepare a polymer cured film.

Examples 1-1 to 1-5 and Comparative Examples 1-1 to 1-3 are shown in the following Table 3.

TABLE 3

| | Polymer (pt) | LiTFSI Content (pt) | Curing Agent (pt) | Solvent (pt) |
|---|---|---|---|---|
| Example 1-1 | A1-1 (100) | 45 | 0.5 | ACN (217) |
| Example 1-2 | A1-2 (100) | 45 | 0.5 | ACN (217) |
| Example 1-3 | A1-3 (100) | 45 | — | ACN (217) |
| Example 1-4 | A1-1 (100) | 45 | 0.1 | ACN (217) |
| Example 1-5 | A1-2 (100) | 45 | 0.1 | ACN (217) |
| Comparative Example 1-1 | B1-1 (100) | 45 | 0.5 | ACN (217) |
| Comparative Example 1-2 | B1-1 (100) | 45 | 0.1 | ACN (217) |
| Comparative Example 1-3 | P(VDF-CTFE) (100) | 45 | — | Acetone:DMSO 1:1(v/v) (900) |

TABLE 3-continued

* LiTFSI: lithium bis(trifluoromethanesulfonyl)imidate
* Curing agent: TDI-TMP (adduct of tolyldiisocyanate-trimethylolpropane)
* P(VDF-CTFE): poly(vinylidene difluoride-co-chlorotrifluoroethylene), Mw = 600,000
* ACN: acetonitrile
* DMSO: dimethyl sulfoxide

Examples 2-1 to 2-5 Preparation of Cured Electrode Protective Layer

Each of the fluorine-based graft polymers prepared in Preparation Examples 2-1 to 2-3 was mixed in a weight ratio (pt) as in Table 4, and stirred for 6 hours to prepare a photocurable polymer solution. The solution was coated on a 2 cm²×0.1 cm circular SUS substrate in a dry room, and then exposed to a metal halide lamp for 3 minutes. After that, the result was vacuum dried for 48 hours at 60° C. to prepare a completely dried polymer electrode protective layer. The amount of the coated polymer solution was adjusted so that a thickness of the final electrode protective layer becomes approximately 100 μm.

Comparative Examples 2-1 to 2-3 Preparation of Cured Polymer Film

Each of the polymers prepared in Comparative Preparation Examples 2-1 and 2-2 was mixed in a composition as in Table 4, and stirred for 6 hours to prepare a homogeneous solution. After that, the same cured film preparation method as the example was used to prepare a polymer cured film.

Examples 2-1 to 2-5 and Comparative Examples 2-1 to 2-3 are shown in the following Table 4.

TABLE 4

| | Polymer (pt) | LiTFSI Content (pt) | Curing Agent (pt) | Photoinitiator |
|---|---|---|---|---|
| Example 2-1 | A2-1 (100) | 40 | 0 | 1 |
| Example 2-2 | A2-2 (100) | 40 | 0 | 1 |
| Example 2-3 | A2-3 (100) | 40 | 0 | 1 |
| Example 2-4 | A2-1 (100) | 40 | 5 | 1 |
| Example 2-5 | A2-3 (100) | 40 | 5 | 1 |
| Comparative Example 2-1 | B2-1 (100) | 40 | 0 | 1 |
| Comparative Example 2-2 | B2-1 (100) | 40 | 5 | 1 |
| Comparative Example 2-3 | B2-2 (100) | 40 | 5 | 1 |

* LiTFSI: lithium bis(trifluoromethanesulfonyl)imidate
* Curing agent: pentaerythritol triacrylate (PETA)
* Photoinitiator: Irgacure 819

Experimental Example (1) Ion Conductivity Measurement on Electrode Protective Layer Ion conductivity of each of the electrode protective layers prepared in Examples 1-1 to 1-5, Examples 2-1 to 2-5, Comparative Examples 1-1 to 1-3 and Comparative Examples 2-1 to 2-3 was obtained using the following Mathematical Formula 1 after measuring the impedance.

After bringing a lithium salt-containing electrode protective layer coated on a circular SUS (stainless steel) substrate into contact with a lithium metal electrode having the same surface area, an alternating current voltage was applied through electrodes on both surfaces of the sample at room temperature. Herein, an amplitude range of a measuring frequency of 0.01 Hz to 1 MHz was set as the applied condition, and impedance was measured using VMP3 manufactured by Bio-Logic. Resistance of the bulk electrolyte was obtained from an intersection ($R_b$) where a semicircle or straight line of the measured impedance trajectory meets the real-number axis, and ion conductivity of the polymer electrode protective layer was calculated from the width and the thickness of the sample, and the results are shown in the following Table 5.

$$\sigma(S \cdot cm^{-1}) = \frac{1}{R_b} \frac{t}{A} \quad \text{[Mathematical Formula 1]}$$

σ: ion conductivity $R_b$: intersection of impedance trajectory and real-number axis A: sample area t: sample thickness Experimental Example (2) Evaluation of Electrochemical Stability on Electrode Protective Layer A cell having a lithium-salt containing polymer electrode protective layer sandwiched between SUS and lithium metal was manufactured in the same manner as in the experimental example. A cyclic voltammetry (IVIUM Technologies) was performed by applying a voltage of 0.0 V to 5.0 V at a rate of 1 mV/sec at 60° C. to evaluate oxidation potential stability by an off-set voltage. The results are shown in Table 5.

Experimental Example (3) Evaluation of Electrolyte Liquid Chemical Resistance on Electrode Protective Layer Each of the polymer electrode protective layers, the electrode protective layer prepared in each of Examples 1-1 to 1-5, Examples 2-1 to 2-5, Comparative Examples 1-1 to 1-3 and Comparative Examples 2-1 to 2-3, was coated on a SUS (stainless steel) substrate, and the result was dipped in a 10 mL diethyl carbonate solution including 1 M $LiPF_6$. After that, the result was deposited for 48 hours at room temperature, and the film shape was visually observed. The results are shown in Table 5.

TABLE 5

| | Ion Conductivity (S/cm) | OFF-Set Voltage (V) | Cured Film Shape |
|---|---|---|---|
| Example 1-1 | $2.3 \times 10^{-7}$ | 4.2 | ○ |
| Example 1-2 | $1.5 \times 10^{-7}$ | 4.3 | ○ |
| Example 1-3 | $1.8 \times 10^{-6}$ | 4.2 | ○ |
| Example 1-4 | $1.0 \times 10^{-6}$ | 4.1 | ○ |
| Example 1-5 | $8.3 \times 10^{-7}$ | 4.2 | ○ |
| Comparative Example 1-1 | $3.9 \times 10^{-7}$ | 3.7 | x |
| Comparative Example 1-2 | $1.1 \times 10^{-6}$ | 3.7 | x |
| Comparative Example 1-3 | $1.0 \times 10^{-9}$ | 4.8 | ○ |
| Example 2-1 | $5.1 \times 10^{-7}$ | 4.3 | ○ |
| Example 2-2 | $3.3 \times 10^{-7}$ | 4.5 | ○ |
| Example 2-3 | $4.5 \times 10^{-6}$ | 4.2 | ○ |
| Example 2-4 | $1.0 \times 10^{-7}$ | 4.5 | ○ |
| Example 2-5 | $9.7 \times 10^{-7}$ | 4.4 | ○ |
| Comparative Example 2-1 | $4.6 \times 10^{-7}$ | 3.7 | x |
| Comparative Example 2-2 | $1.1 \times 10^{-7}$ | 3.7 | x |
| Comparative Example 2-3 | $1.5 \times 10^{-6}$ | 4.1 | Δ |

(○: film remained on SUS while maintaining a film shape; Δ: film remained on SUS while maintaining a film shape, but pin holes were observed everywhere; x: portions where SUS was completely exposed were observed)

As shown in Table 5, results of improving electrochemical stability while having excellent ion conductivity were obtained when identifying ion conductivity and electrochemical stability after bringing the electrode protective layer according to the present invention into contact with lithium metal, and it was identified that the electrode protective layer according to the present invention may be excellently used as a protective layer of a lithium metal electrode. In addition, it was identified that damages on the electrode protective layer caused by side reactions with an electrolyte liquid were unlikely due to high resistance for the electrolyte liquid. In comparison, it was seen that the electrode protective layer without introducing a fluorine-based polymer had inferior electrochemical stability and electrolyte liquid resistance despite excellent ion conductivity, and the graft polymer without introducing a monomer unit comprising poly(ethylene oxide) had very low ion conductivity. The graft polymer without introducing a photocurable functional group on the side chain had insufficient electrolyte liquid resistance even after photocuring, which makes it impossible to be used as an electrode protective layer.

The invention claimed is:

1. A polymer for an electrode protective layer comprising:
   a polymer(A) comprising a fluorine-based polymer in which a monomer unit comprising poly(alkylene oxide) and a monomer unit comprising a curable functional group are grafted on the fluorine-based polymer,
   wherein the curable functional group is a photocurable functional group,
   wherein the polymer(A) comprises a structure of the following Chemical Formula 2:

[Chemical Formula 2]

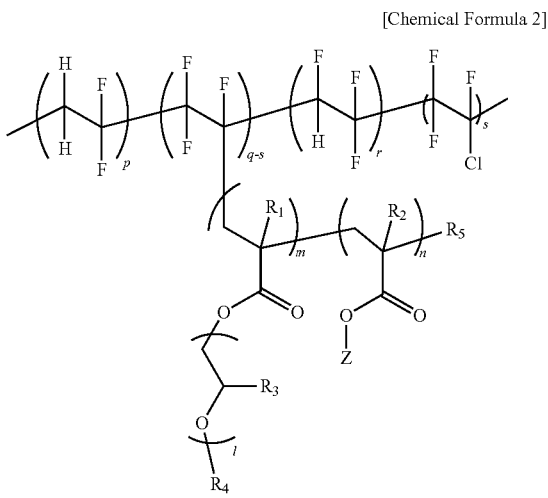

in Chemical Formula 2, p, q, r, and s are each independently $0 \leq p \leq 20{,}000$, $0 < q \leq 22{,}000$, $0 \leq r \leq 15{,}000$ and $0 \leq s < 22{,}000$;

$R_1$, $R_2$ and $R_3$ are each independently hydrogen or methyl;

$R_4$ is any one selected from the group consisting of hydrogen, an alkyl group having 1 to 12 carbon atoms, and a phenyl group unsubstituted or substituted with an alkyl group having 1 to 12 carbon atoms;

Z is a curable functional group represented by the following Chemical Formula 4;

l, m and n are each independently $2 \leq l \leq 230$, $1 \leq m \leq 200$ and $2 \leq n \leq 50$; and $R_5$ is any one selected from the group consisting of hydrogen, chlorine and bromine,

[Chemical Formula 4]

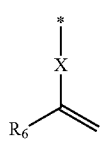

in Chemical Formula 4, $R_6$ is hydrogen or methyl;

X is a single bond, or any one selected from the group consisting of alkylene having 1 to 12 carbon atoms, alkyloxycarbonyl having 1 to 12 carbon atoms

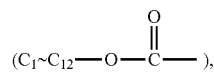

urethane group-containing alkyleneoxycarbonyl having 1 to 12 carbon atoms, poly(ethylene oxide)carbonyl having an ethylene oxide repeating number of 1 to 10 and phenylene, and

* represents a bonding site directly bonding to O in Chemical Formula 2.

2. The polymer for an electrode protective layer of claim 1, wherein the monomer unit comprising poly(alkylene oxide) and the monomer unit comprising the curable functional group have a molar ratio of 99.9:0.1 to 70:30.

3. A polymer composition for an electrode protective layer comprising:
the polymer for an electrode protective layer of claim 1; and
a multifunctional crosslinking agent.

4. The polymer composition for an electrode protective layer of claim 3, wherein the multifunctional crosslinking agent is present in an amount of 0.1 parts by weight to 10 parts by weight based on 100 parts by weight of the polymer(A).

5. The polymer composition for an electrode protective layer of claim 3, wherein the multifunctional crosslinking agent is any one selected from the group consisting of an isocyanate crosslinking agent, an epoxy crosslinking agent, an aziridine crosslinking agent, an alcohol crosslinking agent and an amine-based crosslinking agent.

6. An electrode protective layer formed by thermally curing the polymer composition for an electrode protective layer of claim 3.

7. A polymer composition for an electrode protective layer comprising:
the polymer for an electrode protective layer of claim 1;
a multifunctional vinyl-based crosslinking agent; and
a photoinitiator.

8. The polymer composition for an electrode protective layer of claim 7, wherein the multifunctional vinyl-based crosslinking agent is present in an amount of 0.1 parts by weight to 50 parts by weight based on 100 parts by weight of the polymer(A).

9. The polymer composition for an electrode protective layer of claim 7, wherein the photoinitiator is present in an amount of 0.01 parts by weight to 5 parts by weight based on a total 100 parts by weight of the polymer(A) and the multifunctional vinyl-based crosslinking agent.

10. An electrode protective layer formed by photocuring the polymer composition for an electrode protective layer of claim 7.

* * * * *